United States Patent [19]

Chang et al.

[11] Patent Number: 5,089,985

[45] Date of Patent: Feb. 18, 1992

[54] SYSTEM AND METHOD FOR PERFORMING A SORT OPERATION IN A RELATIONAL DATABASE MANAGER TO PASS RESULTS DIRECTLY TO A USER WITHOUT WRITING TO DISK

[75] Inventors: Philip Y. Chang; Daniel J. Coyle, Jr., both of Austin; Timothy R. Malkemus, Round Rock; Rebecca A. Rodriguez, Pflugerville; Philip J. Welti, Round Rock, all of Tex.

[73] Assignee: International Business Machines Corporation, Armonk, N.Y.

[21] Appl. No.: 179,181

[22] Filed: Apr. 7, 1988

[51] Int. Cl.$^5$ .................. G06F 7/24; G06F 15/20
[52] U.S. Cl. ................... 395/600; 364/974; 364/974.4; 364/974.6; 364/962.2; 364/962.3; 364/DIG. 2
[58] Field of Search ... 364/200 MS File, 900 MS File, 364/300, 400, 401; 340/146.2

[56] References Cited

U.S. PATENT DOCUMENTS

| | | | |
|---|---|---|---|
| 4,210,961 | 7/1980 | Whitlow et al. | 364/300 |
| 4,417,321 | 11/1983 | Chang et al. | 364/900 |
| 4,497,039 | 5/1984 | Wolfe et al. | 364/900 |
| 4,970,391 | 1/1985 | Kitakami et al. | 364/900 |
| 4,506,326 | 3/1985 | Shaw et al. | 364/300 |
| 4,510,567 | 4/1985 | Chang et al. | 364/200 |
| 4,514,826 | 4/1986 | Iwata et al. | 364/900 |
| 4,587,628 | 6/1986 | Archer et al. | 364/900 |
| 4,611,280 | 9/1986 | Linderman | 364/200 |
| 4,628,483 | 12/1986 | Nelson | 364/900 |
| 4,799,152 | 1/1989 | Chuang et al. | 364/200 |
| 4,829,427 | 5/1989 | Green | 364/300 |
| 4,991,134 | 2/1991 | Ivsin | 364/900 |

OTHER PUBLICATIONS

P. Y. Chang et al., "Bit Block Mapping for Sorting Records in a File", IBM Technical Disclosure Bulletin, vol. 24, No. 10, 3/82, p. 4995.

D. Cornell et al., "Vertical Partitioning for Relational Databases", IBM Technical Disclosure Bulletin, vol. 30, No. 9, 2/88, pp. 474-477.

M. M. Astrahan et al., "Access Path Selection in a Relational Database Management System", IBM Technical Disclosure Bulletin, vol. 22, No. 4, 9/79, pp. 1657-1660.

W. R. Warren, "Merge System Using Direct-Access Storage Devices", IBM Technical Disclosure Bulletin, vol. 26, No. 7A, 12/83, pp. 3384-3386.

*Primary Examiner*—Lawrence E. Anderson
*Assistant Examiner*—Gopal C. Ray
*Attorney, Agent, or Firm*—R. M. Carwell

[57] ABSTRACT

In a relational database system, a method is utilized that increases the performance of the sort operation. An optimizer routine in the relational database manager analyzes a user's complete query to determine whether the final sorted results can be used directly by the user as sorting occurs. If the sort results can be used, the sort results are sent to Relational Data Services in the relational database manager for output to the user. Depending upon the determination made by the optimizer routine, one of two output modes for the final sorted sequence string of data are selected by the relational database manager. In disk output mode, the last pass of the final sorted sequence spring is written to disk. In fast direct output mode, the records of data are sent to the user as the final sorted sequence string is being merged during the last pass. The system and method of this invention reduces the total sort time by eliminating the overhead of writing the disk during the fast direct output mode. Also, the response time, or availability for each record is reduced since each record is retrieved or sent to the Relational Data Services immediately after it has been sorted into the final sort order instead of completing the entire sort first, and then writing to disk.

18 Claims, 10 Drawing Sheets

TABLE NAME: PAYROLL

| ID | DEPT | SALARY |
|---|---|---|
| 30 | D1 | 400.00 |
| 20 | D1 | 650.00 |
| 50 | D2 | 900.00 |
| 10 | D1 | 650.00 |
| 70 | D2 | 700.00 |
| 60 | D2 | 500.00 |
| 100 | D1 | 550.00 |
| 90 | D2 | 900.00 |

SYSTEM AND METHOD FOR PERFORMING A SORT OPERATION IN A RELATIONAL DATABASE MANAGER TO PASS RESULTS DIRECTLY TO A USER WITHOUT WRITING TO DISK

BACKGROUND OF THE INVENTION

1. Field of the Invention

This invention relates to computerized databases and, more particularly, to a system and method of sorting data in a relational database.

2. Description of the Related Art

A database is used to store vast quantities of data for future retrieval upon request by a user. A user can be either an application program or an end user interacting with the database system through an input device. Related groups of data are commonly referred to as files of data, or tables, as commonly used in relational databases. The rows of data in a table are referred to as logical records, and the columns of data are referred to as fields. In a relational database system, the user perceives the data only as tables, and not in any other organizational form, e.g. a hierarchical structure of data.

These database systems typically include a computer program, commonly referred to as a database manager, for storing, editing, updating, inserting, deleting, and retrieving data in response to various commands entered through a user interface. A database manager handles all requests from users to the database to perform the various functions as listed above.

Specifically, with respect to retrieval of data, numerous computer languages were devised for formulating search commands or "queries" to which the database manager was responsive in providing the requested data. These queries were basically search instructions encoded so as to cause a computer and associated database manager to carry out the desired search.

Several problems have been associated with these languages for formulating database queries First, many of the query languages differed from conventional programming languages. The database user with programming experience was thus required to learn an entirely new set of commands just to get meaningful data out of the database Users without such experience, such as many terminal operators who are also without computer experience of any kind, were thus forced to learn a form of computer programming just to interact with the database Moreover, such query languages required knowledge of highly complex syntax and semantics rules, thereby further limiting the numbers who could successfully retrieve data to only a highly and expensively trained few. This, in turn, adversely affected the utility of such computer systems and seriously inhibited their use by a widespread number of individuals.

The structured query language (SQL) is an interactive query language for end-users to utilize to interface with the database manager to retrieve information, and a database programming language which can be embedded in an application program to access the data in the database through the database manager. SQL is an easy way to specify the type of information needed.

A representative of such query language is the Standard Query Language or "SQL" detailed in the Draft Proposal, ANA Database Language SQL, Standard X3.135-1986, American National Standard Institute, Inc., 1430 Broadway, New York, N.Y. 10018. A detailed discussion of SQL is also set forth in "IBM Database 2 SQL Reference" Document Number SC26-4346-3, IBM Corporation, both of which are incorporated herein by reference.

A major advantage of a relational database system is that instead of performing an explicit operation by the control of the user, the database receives inputs independently of the user that increases performance of retrieval of the data. All the user has to do is to specify the type of information that the user wants to retrieve from the database. For example, if a user wants information from two different tables of data, a relational database system will figure out how to retrieve the information from both tables of data in the most efficient way.

In database systems prior to relational database systems, the programmer controlled how the information was retrieved. In a relational database system, the system decides how to retrieve the data.

In many database processing systems, the sort function is an important part of the system. In some instances, half of the computing power of a database processing system can be utilized for the sort function alone. In a relational database, a user utilizes a sort command if the user wants the output ordered in a certain way. There is also an implicit sort which is used by the database system when the system decides that a sort function is needed to efficiently retrieve information for a user. For example, a relational database system utilizes a sort when two tables are to be joined together more efficiently.

A sort function is an expensive function in a processing system since it requires a lot of processing time to perform compare instructions that are necessary to the sort command. In addition, if a large amount of data is to be sorted, the database system will write an intermediate portion of the data being sorted to a disk or hard file. This portion of data is read back and further sorted If all the data that is to be sorted can be stored at one time in the memory of the CPU, no external sort using an I/0 operation is needed. If all of the data can not be stored at one time in the memory of the CPU, a portion of that data is sorted, the result is stored to disk, and a portion of the sorted data on a hand file is read back into memory to be further sorted with another portion of unsorted data.

Writing and reading back from a file can occur multiple times during a sort operation. The time that it takes to perform an I/0 operation can be very costly in a sort operation.

Sort time performance is a critical competitive measure of relational database products for several reasons. First, the sort operation is one of the most frequently used operations in a relational database system. Second, improvements in query performances, such as those queries that utilize a sort operation, are very perceptible by the end user by the amount of time that a user has to wait for the result of the query. Therefore, sort performance in a relational database is an important competitive bench mark in database products.

For more background on relational databases and the SQL language, the following reference is herein incorporated by reference, Date, C. J. *An Introduction to Database Systems*, The Systems Programming Series, Volume 1, Fourth Edition, Addison-Wesley Publishing Company, 1986.

SUMMARY OF THE INVENTION

It is therefore an object of this invention to increase the performance of a sort operation in a relational database.

When sorting a significant amount of data, i.e. more data than can be stored in the memory of the CPU at one time, only the amount of data that can be stored in memory at one time is used, and then it is stored to a hard file disk. It is typically stored to disk in sorted order. A next group of data is then stored in memory of the CPU, sorted, and stored to disk. This is repeated until all the data has been separately grouped, sorted, and stored separately to disk.

The groups of sorted data on disk are then merged together. A first portion of all the groups are brought together and sorted and stored back to disk. This is repeated such that the remaining portions of the groups of data are sorted together and stored back to disk.

The system and method of this invention increases the performance of a relational database as seen by a user by eliminating the I/0 operations of writing the final sorted data out to disk. Instead, the results of the sorted data are presented to the user as they are organized into the final sort order. The overhead of writing the final sorted data to disk and reading it back into memory is eliminated. Since the ordered data is passed back to the requestor as the data is actually ordered, the requestor does not have to wait until the entire set of data is ordered.

Sort services, a component of a relational database manager using this technique, provides a capability to receive rows of data and organize them into the requested ascending or descending order. There are two major parts to a sort. First is the insert phase where rows of data are received from relational data services (RDS) and placed into ordered sequence strings. Second is the merge phase that is done after all rows of data are received. The merge phase takes the sequence strings and merges them together into a single string of ordered data. Previous database management systems place this final string of data in a temporary file on disk. Writing to disk is referred to herein as the disk output mode. In the present invention, relational data services can read this data as it needs it in a fast direct output mode.

An optimizer routine determines which mode, disk output mode or fast direct output mode, will be the most efficient for a given query statement. The mode selected will depend upon whether the query statement will use the sorted data only one time or multiple times.

In the cases of some SQL operations such as Order By, Group By, or the outer pass of a Merge/Join, the direct output mode is more efficient than the disk output mode by removing much of the overhead of the merge phase. The insert phase is done the same regardless of whether output is going to be to an output file or directly to relational data services.

At the start of the merge phase, sort services tests to find whether the optimizer routine of relational data services indicated that the final sorted data does not need to be placed on disk in the form of an ordered temporary file. If the data is not required to be placed on disk, sort services proceeds with its merge until it gets to its final pass.

The final pass is recognized by comparing the number of sequence strings remaining to the number of merge buffers. If the number of merge buffers is equal or greater than the number of sequence strings, then it is the last pass. This means that each row selected from the top entries of all sequence strings is the next entry in the final sorting output. When sort services recognizes that it is ready to start the final merge pass, and it is doing fast direct output, it returns to relational data services indicating that it is ready to accept sort fetches from relational data services. When relational data services does a sort fetch, sort services chooses the correct next row from the remaining sequence strings, and returns it to relational data services. This process is repeated until all rows are returned to relational data services.

There are two major areas of improved performance with the system and method of this invention. First, total end-to-end sort time is reduced by eliminating a disk write and read of all sorted data. Second, the response time for each sorted row is improved since the records are returned to the user through the relational data services as the records are put in final sort order, rather than waiting for all the records to be sorted before returning any of them to the user through relational data services.

DESCRIPTION OF THE PREFERRED EMBODIMENT

Figure 1A:
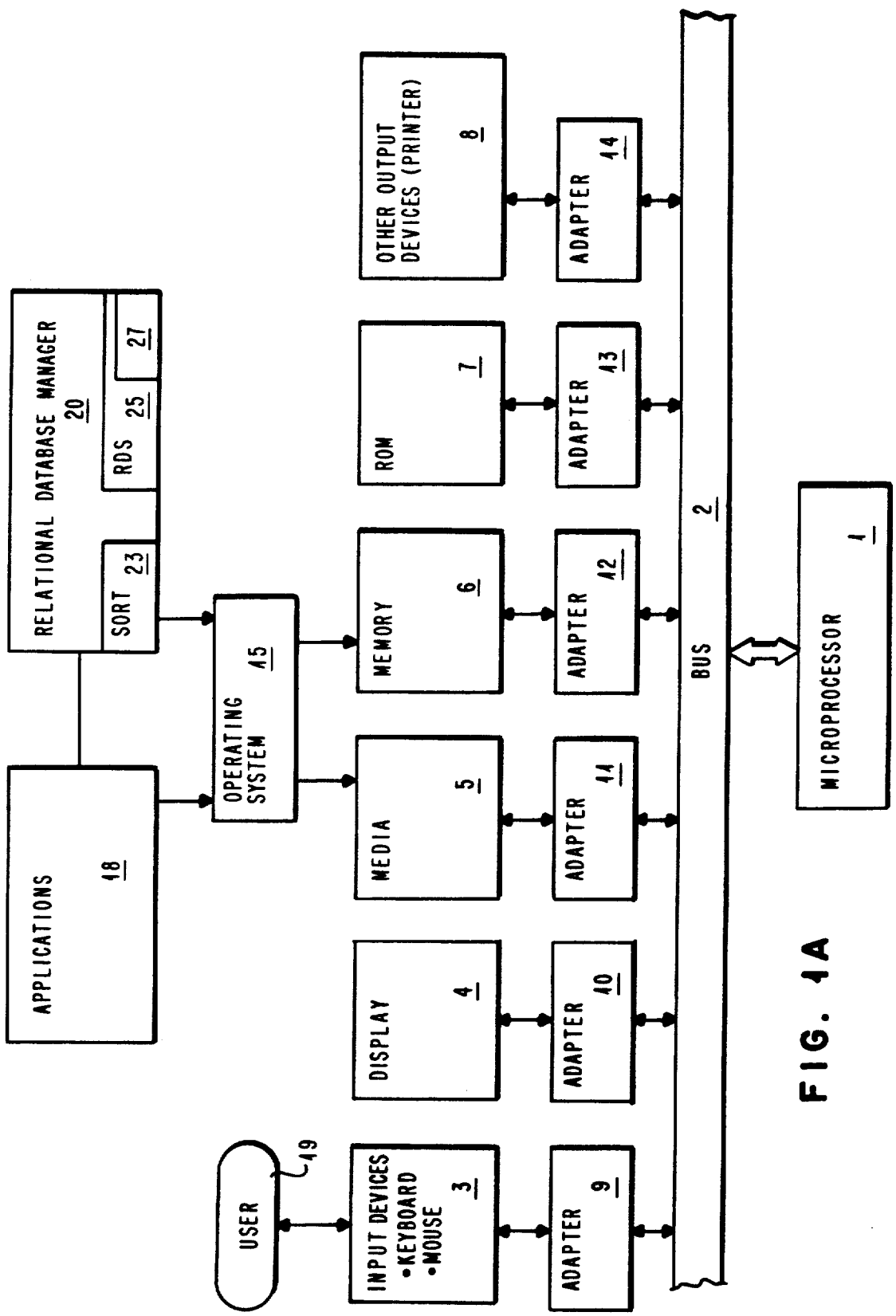
FIG. 1A and FIG. 1B are generalized views of the data processing system of this invention.
Figure 1B:
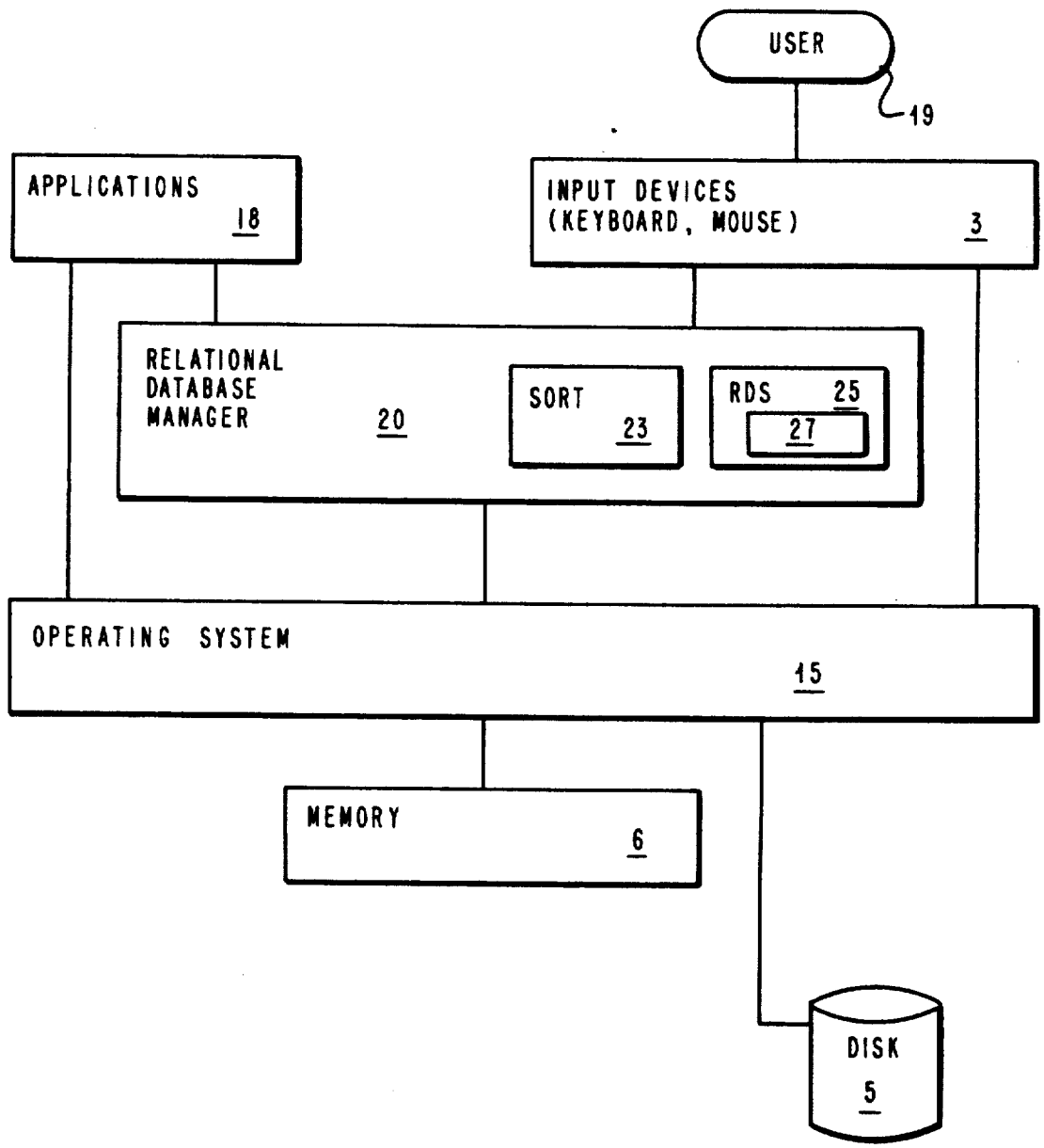

Beginning with reference to the block diagram of FIG. 1A and FIG. 1B, a generalized view of the processing apparatus which may be used to carry out the present invention is shown.

FIG. 1A shows a typical personal computer architecture, such as the configuration used in the IBM Personal System/2. The focal point of this architecture comprises a microprocessor 1 which may, for example, be an Intel 80286 or 80386 or similar microprocessor. The microprocessor 1 is connected to a bus 2 which comprises a set of data lines, a set of address lines and a set of control lines. A plurality of I/O devices or memory or storage devices 3-8 are connected to the bus 2 through separate adapters 9-14, respectively. For example, the display 4 may be the IBM Personal/System Color Display 8514 in which the adapter 10 may be integrated into the planar board. The other devices 3 and 5-8 and adapters 9 and 11-14 are either included as part of an IBM Personal System/2 or are available as plug-in options from the IBM Corporation. For example, the random access memory 6 and the read-only memory 7 and their corresponding adapters 12 and 13 are included as standard equipment in the IBM Personal System/2, although additional random access memory to supplement memory 6 may be added via a plug-in memory expansion option.

Within the read-only memory 7 are stored a plurality of instructions, known as the basic input/output operating system, or BIOS, for execution by the microprocessor 1. The BIOS controls the fundamental operations of the computer An operating system 15 such as OS/2 is loaded into the memory 6 and runs in conjunction with the BIOS stored in the ROM 7. It will be understood by those skilled in the art that the personal computer system could be configured so that parts or all of the BIOS are stored in the memory rather than in the ROM 7 so as to allow modifications to the basic system operations by changes made to the BIOS program, which would then be readily loadable into the random access memory 6.

For more information on the Personal System/2, and the operating system OS/2, the following reference manuals, which are herein incorporated by reference, are suggested. Technical Reference Manual, Personal System/2 (Model 50,60 systems), IBM Corporation, part number 68X2224, order number S68X2224. Technical Reference Manual, Personal System/2 (Model 80), IBM Corporation, part number 68X2256, order number S68X-2256. IBM Operating System/2 version 1.0 Standard Edition Technical Reference, IBM Corporation, part number 6280201, order number 5871-AAA. Iacobucci, Ed, OS/2 Programmer's Guide, McGraw Hill, 1988.

In the apparatus of this invention, an application program 18 such as a relational database manager 20 may also be loaded into the memory 6 or be resident on media 5. Media 5 may include, but is not limited to, a diskette, or a hard file. The relational database manager 20 may also be considered an extension of the operating system 15. The relational database manager 20 comprises a comprehensive set of relational database manager tasks, including but not limited to, a sort task 23, a relational data services task 25, and an optimizer task 27. The relational database manager tasks provide instructions to the microprocessor 1 to enable the processing system shown in FIG. 1A and FIG. 1B to perform relational database functions. An application program 18, loaded into the memory 6 is said to run in conjunction with the operating system previously loaded into the memory 6.

In the processing system of FIG. 1A and FIG. 1B, the operator 19 accesses the relational database manager 20 through operator control keys on keyboard 3. The keyboard drives the processor 1 which is operably connected to the display 4 as well as the media storage 5 and memory 6 through bus 2. As a user interacts through the keyboard 3 with the relational database manager 20, the relational database manager 20 and its data are displayed to the user through display 4. In addition to a user interacting with the relational database manager 20, an application 18 could interact with the database manager 20 through SQL commands in the application 18.

Figures 2A, 2B:
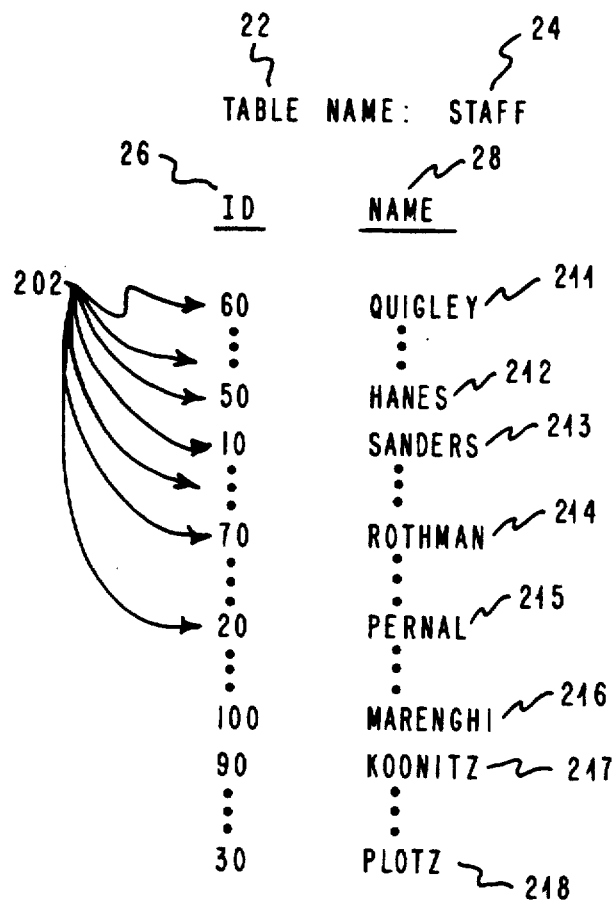
FIG. 2A and FIG. 2B illustrate sample tables for use in a relational data base.

The present invention will be described with reference to the database tables shown in FIG. 2A and FIG. 2B. In the SQL language, the database table 22, FIG. 2A, would be defined and described by a user as follows:

```
CREATE TABLE STAFF
   (   ID    INTEGER,
       NAME VARCHAR (10))
```

CREATE TABLE is an example of a SQL data definition statement. Each CREATE TABLE statement gives the name 24 of the table 22 to be created, the names of its columns 26, 28, and the data types of those columns. After the user executes the CREATE TABLE statement, the table will be empty initially, i.e., the table will not contain any data rows 202. However, a user can immediately insert the data rows 202 using the SQL INSERT statement to get the table as shown in FIG. 2A. The user is now able to do some useful operations with this table, along with any other tables that have been created as shown in FIG. B. For example, the user could order the data in the table 22 by ID number, could join table 22 with another table, e.g., with a table 21 having corresponding salaries for each of the ID numbers, or perform a GROUP BY operation such as selecting the maximum salary and grouping by department. If the operation MERGE JOIN is used to join multiple tables two at a time, the relational database manager performs a sort operation, if indexes are not available, to order the rows sequentially from the tables.

Figure 3:
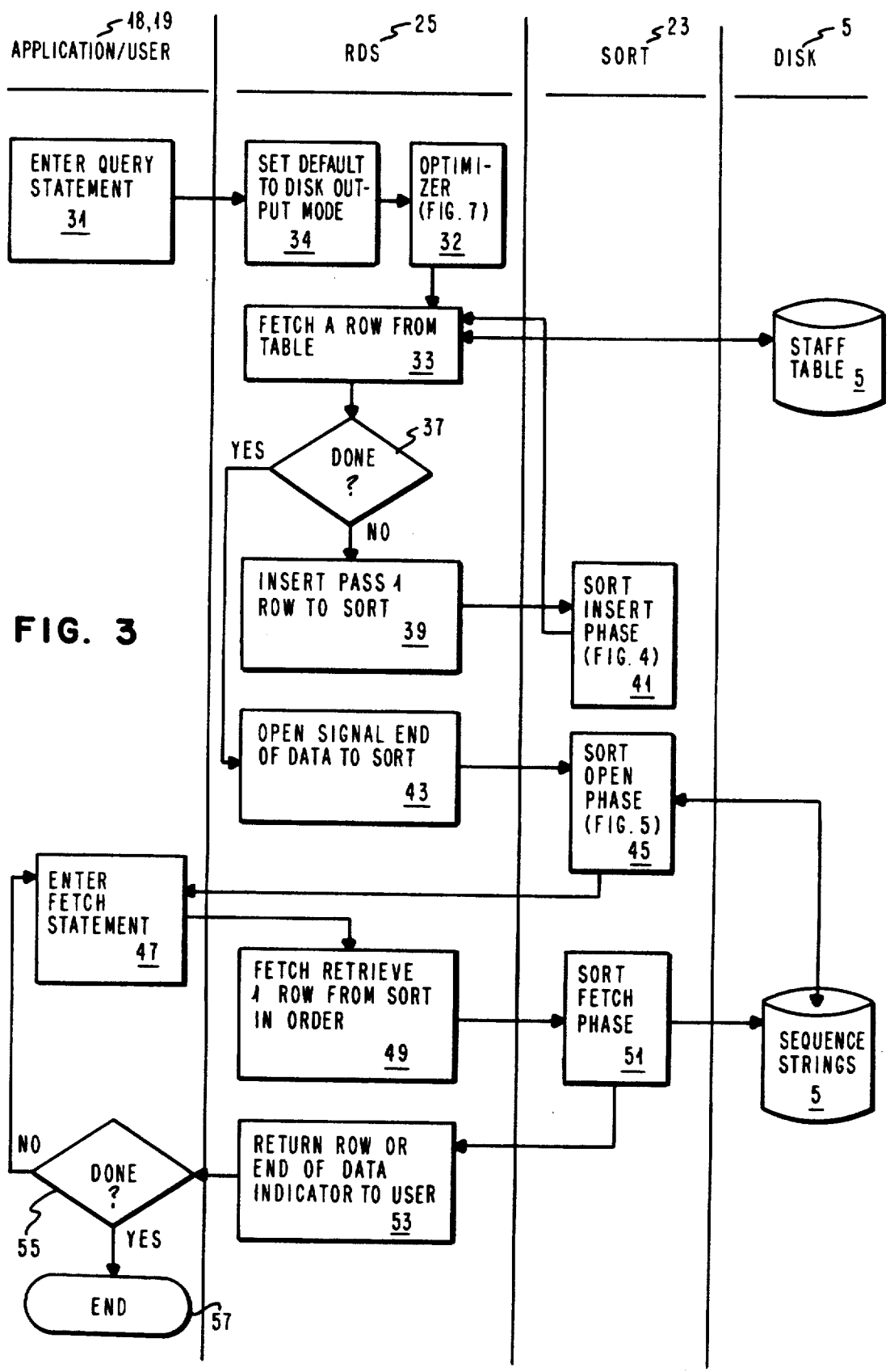
FIG. 3 is a flow chart of the overall method of this invetion.

Referring to FIG. 3, the user 19 or an application 18 would enter the statement for the operation desired, step 31. For example, the user/application may issue the following statement: SELECT * FROM STAFF ORDER BY ID. The command SELECT * is used to get all the columns of a row.

The optimizer 27 FIG. 1A, 1B, would then determine which output mode would be used for the given operation statement entered by the user/application, step 32 FIG. 3. The default mode is the disk output mode, step 34, which may be changed for certain sort plans to the fast direct output mode by the optimizing routine 32. The optimizer 27 is a component of relational data service 25 which decides which of several methods, i.e. plans, of accessing data should be used for a given query statement. For example, whether an index should be used or a sequential scan, or whether a sort operation should be performed. The optimizing routine, step 32, FIG. 3 is further shown and described with reference to FIG. 7, which is a routine that is invoked after the optimizer 27 has produced all the plans needed to process a query statement. A plan represents an operation on a table such as a table access or a join which is used to produce the result of a query. For example, a join plan has two input plans; one for the outer table, and one for the inner table. The outer table is accessed first with matching rows of the inner table being joined with each row of the outer table. The optimizer routine 32 is invoked for each of the plans for the query. When sort plans are first created, they have the disk output option. The following optimizer routine 32 may change the disk output option of certain sort plans to the fast direct output option.

Figure 7:
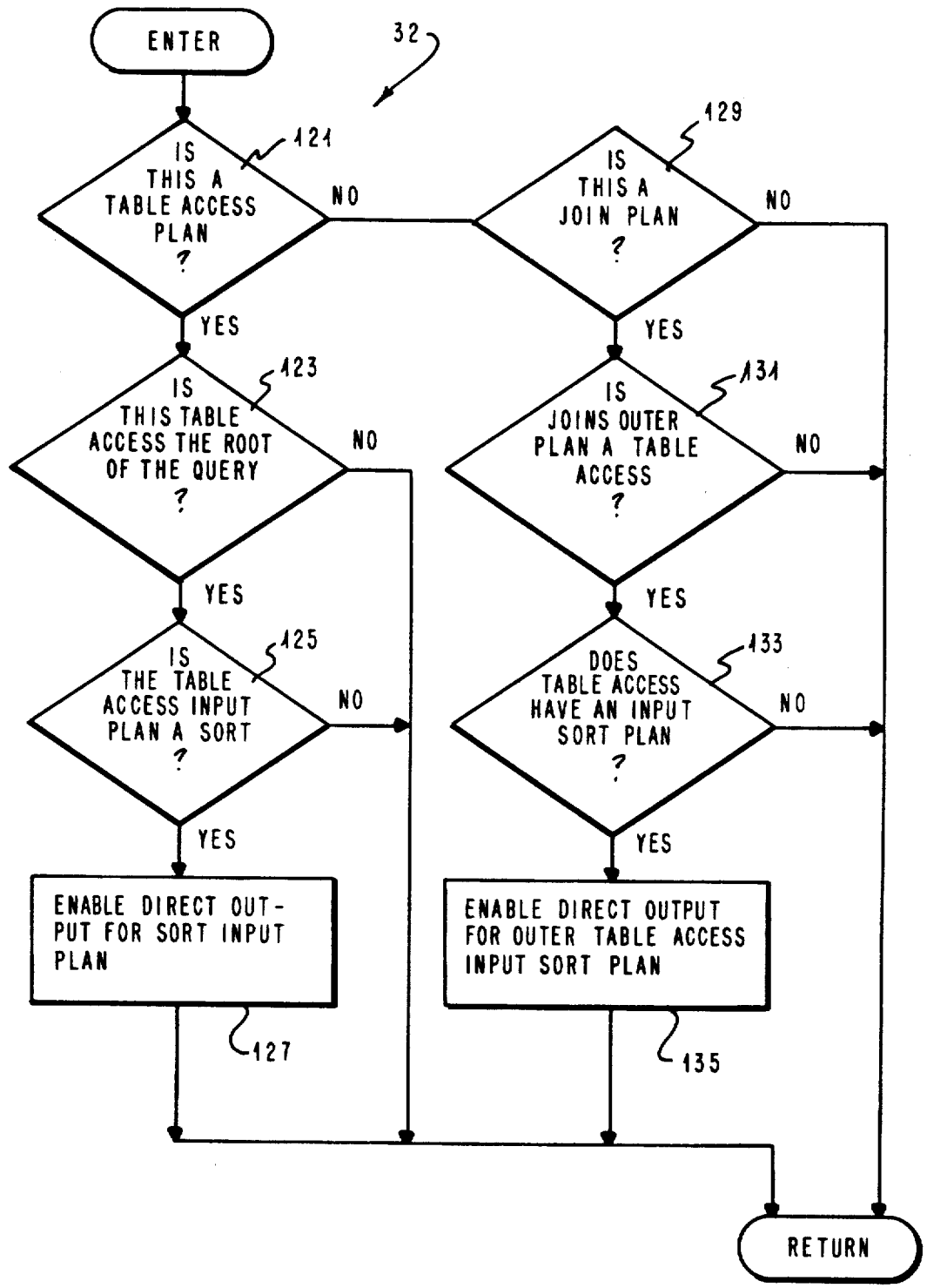
FIG. 7 is a flow chart of the optimizer for determining the output mode of this invention.

The optimizer routine 32, FIG. 7, first determines if the plan is a table access plan, step 121, FIG. 7. A table access plan is a request to read the rows of a table, one at a time. If the plan is a table access plan, step 123 determines if the plan is the root plan of a query. A root plan produces the final result of the query. If it is not, the routine returns without enabling fast direct output. If it is, step 125 determines if the table access plan has a sort input plan. If it does, the sort plan is enabled for fast direct output, step 127. Otherwise, fast direct output is not enabled, and the routine exits.

If the plan is not a table access plan as determined in step 121, step 129 determines if the plan is a join plan. A join plan represents the accessing of two tables, and combining them. If it is not, fast direct output is not enabled, and the routine exits. If it is a join plan, step 131 determines if the join plan's outer plan is a table access plan. If it is not, fast direct output is not enabled and the routine exits. If it is, step 133 determines if the table access plan has an input sort plan. If it does, fast direct output is enabled for that sort plan, and the routine exits. Otherwise, fast direct output is not enabled, and the routine exits.

Referring back to FIG. 3, after the user/application entered the query statement, step 31, and the optimizer determined the appropriate output mode for that operation, step 32, the relational data services 25 of the relational database manager 20 would then fetch a row 211-218 one at a time from the table 22 (FIG. 2A) that has been stored on disk 5, step 33, FIG. 3. Several of the query statements, including the ORDER BY statement, require the relational database manager 20 (FIG. 1A, 1B) to perform a sort operation to get the rows of data 202 (FIG. 2A) in the requested order.

As shown in the flow diagram of FIG. 3, the sort function 23 has three major phases. In the insert phase 41, the rows are received by sort 23 in unknown order. The insert phase 41 will be further described with reference to FIG. 4. In the open phase 45 of sort 23, the sort 23 prepares the data for returning in sorted order. The open phase 45 will be further described with reference to FIG. 5. In the fetch phase 51 of sort 23, the data is returned through the relational data service 25 to the caller in sorted order. The fetch phase will be further described with reference to FIG. 6.

As the relational data service 25 receives a row 211 from the table 22, step 33 FIG. 3, relational data service 25 passes this row 211 to the sort function 23 in the sort insert phase, step 41. During the sort insert phase, rows of data are received from the relational data service component 25 of the database manager 20. This data is received in unordered form, and there is no indication of how much data will be received.

Figure 4:
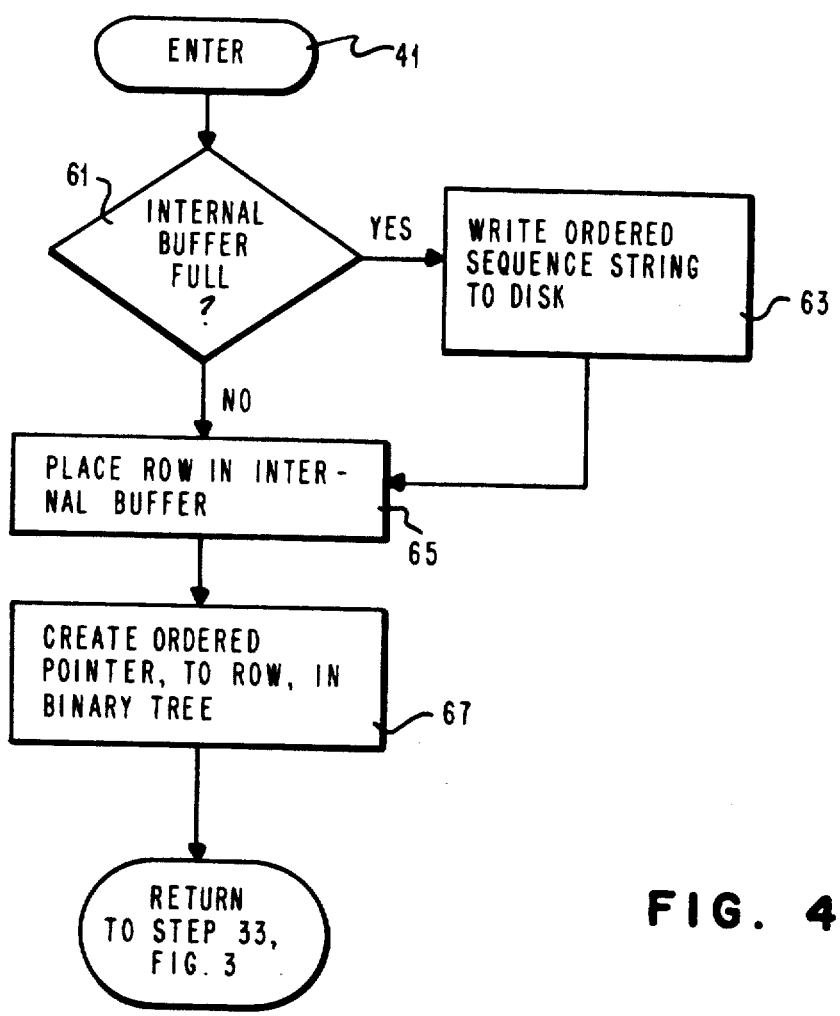
FIG. 4 is a flow chart of the sort insert phase of this invention.
Figure 8:
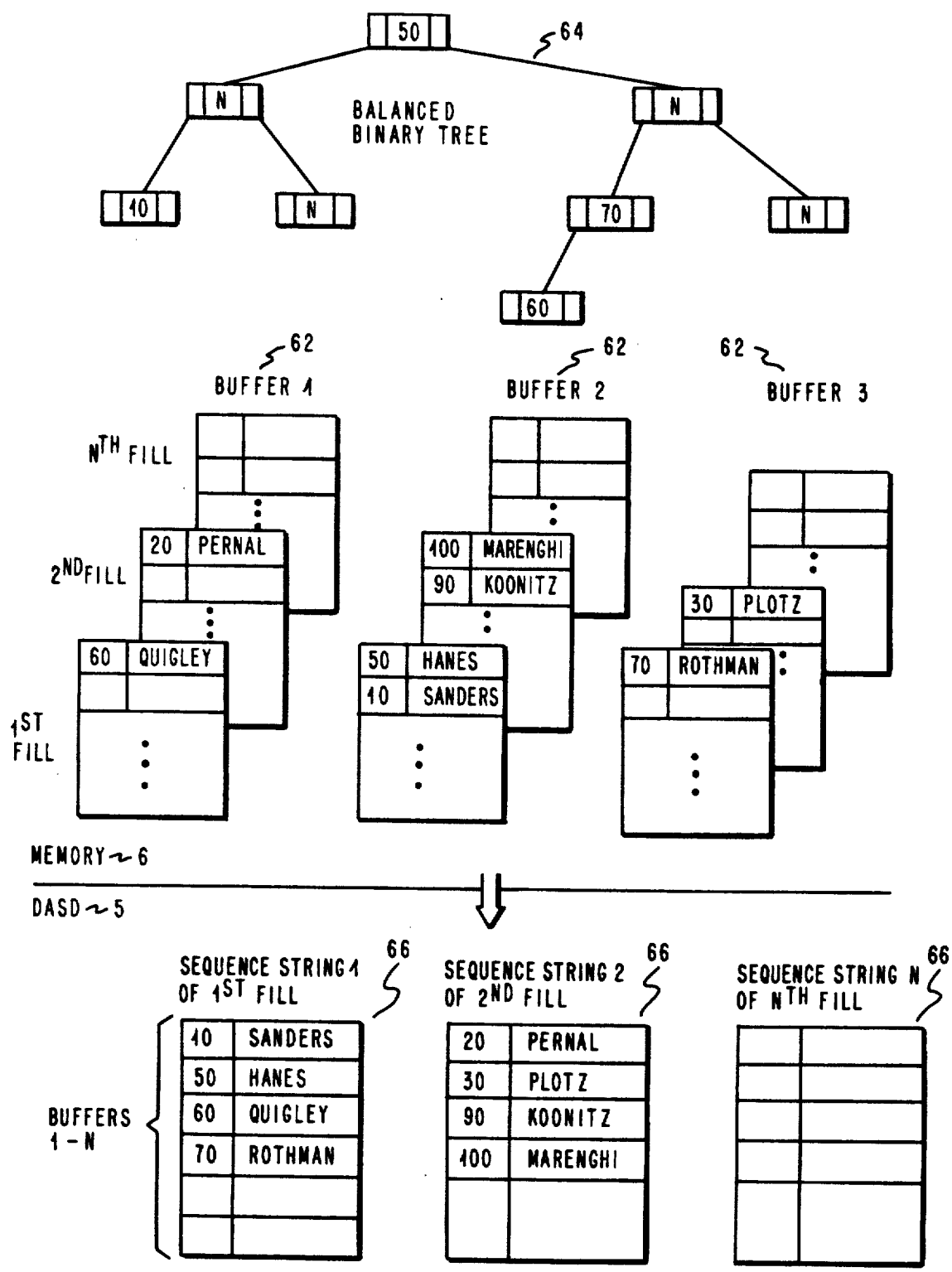
FIG. 8 illustrates the data in internal buffers in memory and the resulting multiple sequence strings on disk.

The sort insert phase is further described in reference to FIG. 4 and FIG. 8. Sort receives one row of data with each call from relational data service 25 during the sort insert phase 41. A test is made, step 61, to determine if space is available in the internal buffers 62 for the data. If space is available, sort 23 places the data 211-218 (FIG. 2A) into internal buffers 62 (FIG. 8) in sequential order as the data is received, step 65, (FIG. 4). Sort 23 then builds an entry for a balanced binary tree 64 to point to the row of data in the buffer 62, step 67. The binary tree 64 is used to track the sorted order of the data.

If the internal buffers 62 are full, step 61, the data is written to disk as an ordered sequence string 66 (FIG. 8), step 63 (FIG. 4), of all of the data from all the buffers 62 combined. As additional rows are received from relational data service 25, the internal buffers 62 will be filled again, with the process being repeated as many times as needed to handle all the data received. Each time the internal buffers 62 are written to disk 5, step 63 (FIG. 4) a new sequence string 66 is formed of all of the data from all of the newly filled buffers 62.

Referring back to FIG. 3, if all the rows have been fetched from the table by relational data service 25 and sent to the sort insert phase, step 37, then relational data service 25 signals the end of the data to be sorted, step 43. The second phase of the sort function 23, sort open 45, is invoked by a call from relational data service 25 signalling that no more data rows will be passed to sort 23. At this time, sort 23 prepares to return the sorted rows to relational data service 25.

The system and method of this invention allows the sorted rows to be returned to relational data service 25, in one of two modes. One mode, disk output mode, results in all the sorted data being written to disk in the form of an ordered temporary file. In the other mode, called fast direct output mode, as each row is placed into final sorted order, it can be passed directly back through relational data service 25 to the user/application when requested. Each method has performance advantages that depend on how the results will be used. If the sorted data is only going to be used once, as determined by the optimizer routine 32 in FIG. 7, it is best to pass it directly back to avoid the time needed to write it to a file and later retrieve it. However, if the sorted data is to be used more than once, it is best to write the data to disk so it is only sorted once prior to multiple usages. For example, if the optimizer routine 32 FIG. 7, determined that the plan was a root plan, then the sorted data would be used only once and the fast direct output mode was enabled. Also, if the outer table is joined, the sorted data will only be used once and the fast direct output mode is enabled. If not, the inner table was joined meaning the sorted data would be used more than once. In this case, the fast direct output mode was not enabled.

Relational data service 25 pre-compiles the SQL statements that require sort 23. Relational data service 25 goes through a decision process to determine if it is more efficient to have the sorted data go directly back to relational data service 25, or be written to disk. The determining factor is whether the data will be used one time or multiple times. Relational data service 25 recognizes this by examining the operation type requested. Generally, if an ORDER BY or GROUP BY operation is called for, direct return of data to relational data service 25 can be implemented. However, for a MERGE/JOIN operation, the output mode depends on the part of data being processed. When an outer pass of a MERGE/JOIN is performed, the direct output mode can be used for increased performance. For all other sorts required during a MERGE/JOIN operation, the output to disk mode would be preferable. The optimizer 27 of the relational data service 25 selects the optimal method for sort output with no special knowledge of action by the user/application.

Figure 5:
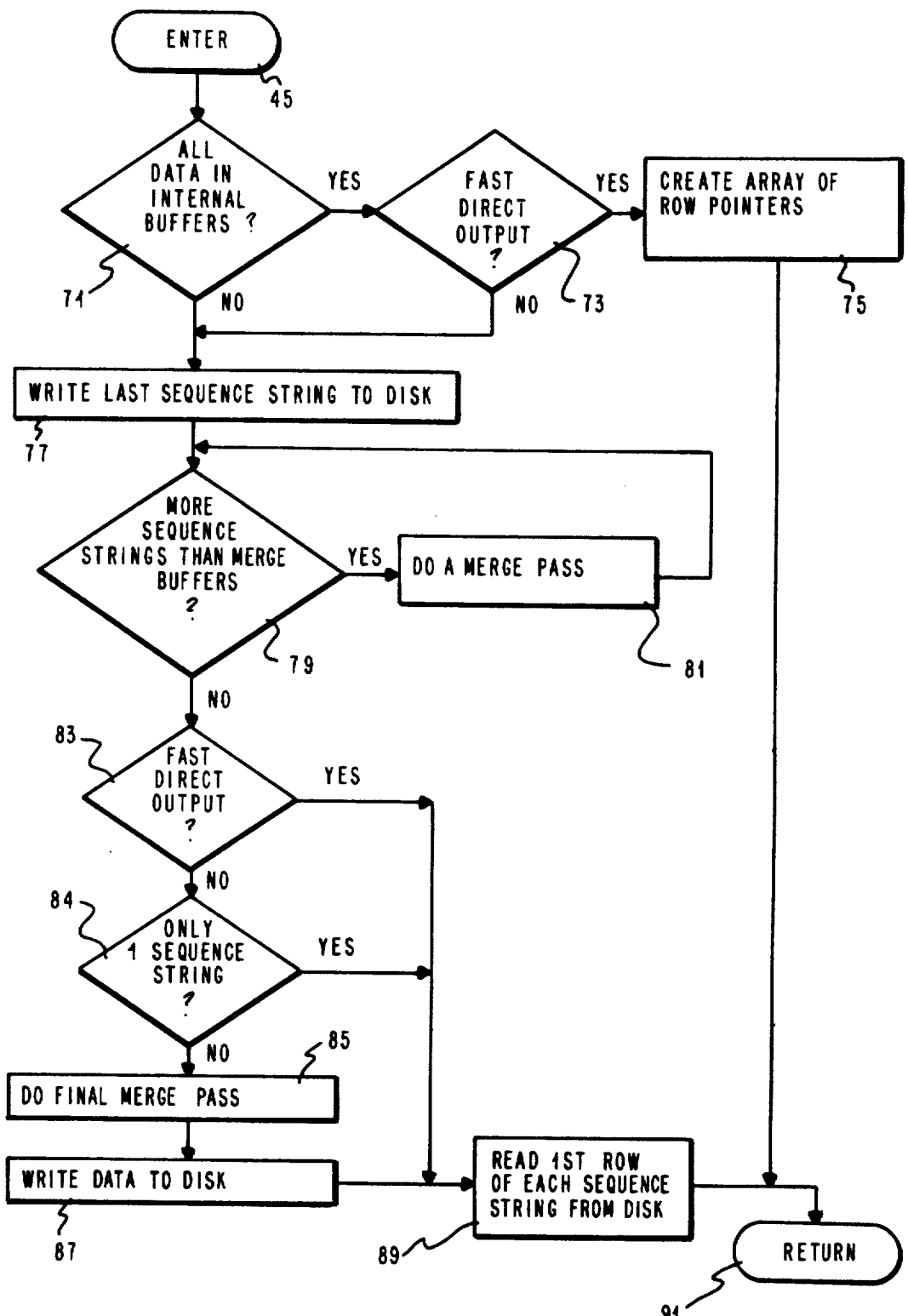
FIG. 5 is a flow chart of the sort open phase of this invention.
Figure 6:
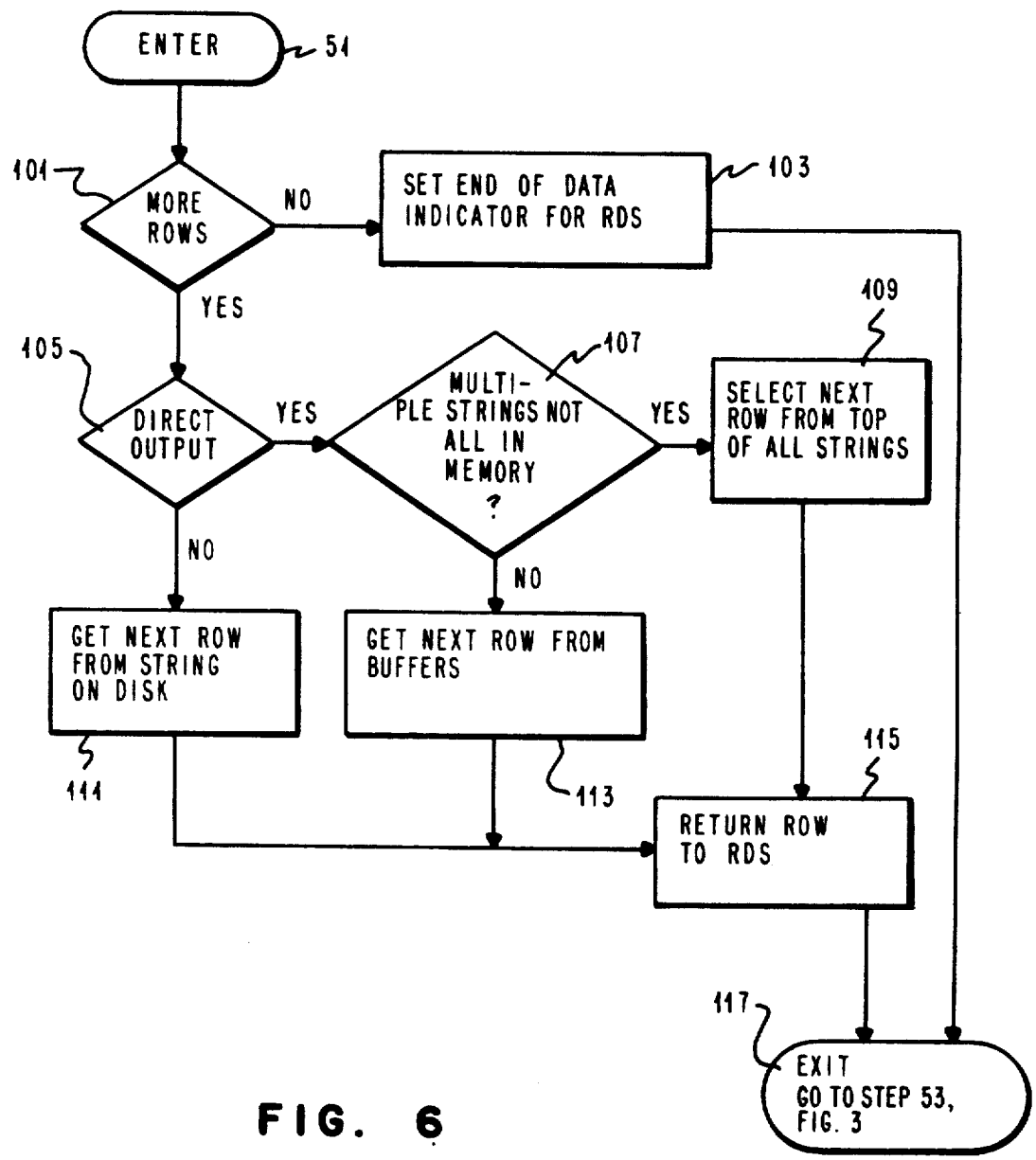
FIG. 6 is a flow chart of the sort fetch phase of this invention.
Figure 9:
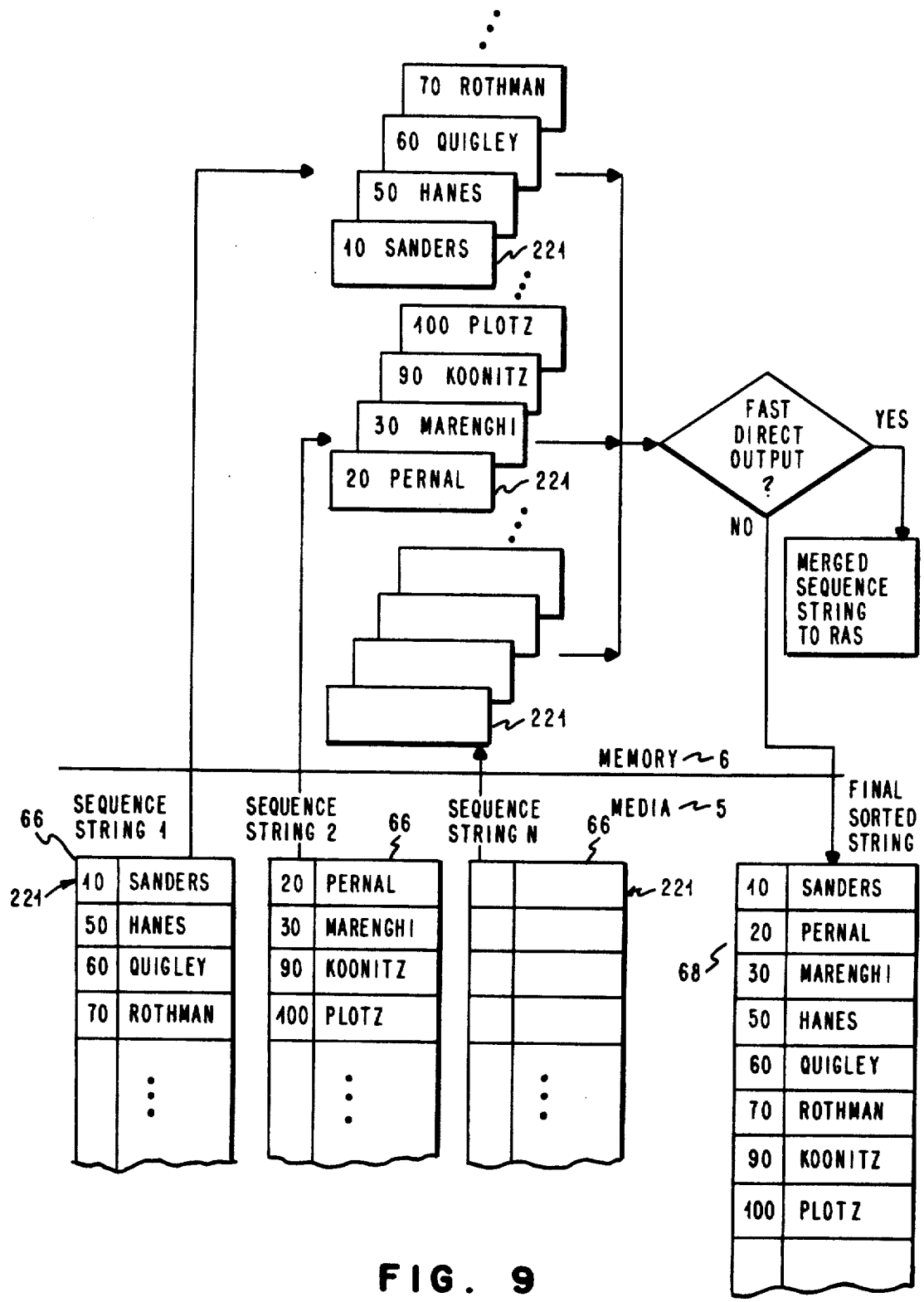
FIG. 9 illustrates merging the multiple sequence strings to a final sorted string to disk or to a user through relational data services, depending on the output mode.

The sort open phase 45 will be further described in reference to FIG. 5, FIG. 8, and FIG. 9. If the optimizer 27 of relational data service 25 selects the output to disk mode, the following steps are performed.

First, sort 23 writes any data remaining in its internal buffers 62 (FIG. 8) to disk 5 as an ordered sequence string 66, step 77. If there is only one sequence string on disk, step 84, the data is in its final sorted order. Sort 23 will then read the first page of the sequence string 66, step 89. The sort open phase 45 is then completed. If there are multiple sequence strings on disk, sort 23 must combine them into a single sequence string through a merge operation, step 81. The merge operation, FIG. 9, involves comparing the top rows 221 from each sequence string 66, picking the next one in the overall ordered sequence from the sequence strings, and placing it into the merged sequence string 68. This process is continued until there only remains one final sequence string 68, on disk, containing all the sorted data.

Referring to FIG. 3, during the output to disk mode, the third phase of sort 23, called the fetch phase 51, is invoked by relational data service after the insert phase 41, and the open phase 45 have been completed. The fetch phase 51 consists of relational data service issuing a fetch request for each row of sorted data, step 44. In response to each fetch, sort 23 retrieves a row of data from the final sequence string on disk, and passes it to relational data service 25.

The above disk output mode is used if the sorted data is to be used repeatedly. In this case, the fast direct output mode is not enabled, and the sort function 23 operates as previously described. The fast direct output mode is enabled for those cases where the sorted data will be accessed only once by relational data service. Relational data service enables the fast direct output mode for the SQL operations such as ORDER BY, GROUP BY, or the outer pass of a MERGE/JOIN.

During the direct output mode, sort 23 has the same three phases as described previously. The insert phase 41 (FIG. 4) is performed in the same way regardless of whether the disk output mode of the direct output mode is selected. However, the open phase 45 (FIG. 5) and the fetch phases 51 (FIG. 6) are changed if the direct output mode is selected Referring to FIG. 3, when sort 23 is called by the relational data service 25 to open, step 41, it signals the end-of-data, step 43, and the preparation of the fetch operation. Referring to FIG. 5, the sort open phase 45 tests to find if relational data service enabled the fast direct output mode, step 73. If the fast direct output mode is enabled, the final sorted data will not be placed on disk in the form of an ordered temporary file.

Sort 23 tests to find if all of the data is in memory, step 71 (FIG. 5). If all of the data is in memory, sort 23 creates an array of pointers to the rows of data in the buffers, step 75. Then, sort 23 returns to relational data service 25 indicating that it is ready to accept sort fetches from relational data services 25, step 91. If there is more data than fits in memory, and fast direct output mode has been selected, sort proceeds as previously described through steps 77, 79, and 81 (FIG. 5). If there are multiple sequence strings, sort will continue merging them until sort is ready for the final pass. The final pass is recognized by comparing the number of sequence strings remaining to the number of merge buffers, step 79. If the number of merge buffers is equal or greater than the number of sequence strings, then it is the last pass. After this time, each row selected from the top entries of all sequence strings is the next entry in the final sorted output, step 89. When sort recognizes that it is ready to start a final merge pass (or there was only one or no merge pass required), it returns to relational data service indicating that it is ready to accept sort fetches from relational data service, step 91.

Referring to FIG. 3, after completion of the open phase step 45, relational data service 25 can fetch sorted data rows from sort 23. The sort fetch phase 51, is further described in FIG. 6. Each time relational data service calls sort for a sort fetch operation, sort fetch determines if there is a next row, step 101. If there is not a next row, sort fetch sets an end of data indicator for relational data service, step 103, and returns to relational data service, step 117. If there is a next row, and fast direct output has been selected, a test is made to determine if the data is coming from disk, or if the data is coming from memory, step, 107. If all of the data is in memory, sort fetch selects the next row from the buffers, and returns the row to relational data service, step 113, 115. If the data is coming from sequence strings on disk, the sort fetch phase selects the next row from the top of all strings, step 109. This is also illustrated in FIG. 9. The row of data is then passed tb relational data service, step 115. In cases with multiple sequence strings, sort with direct output is, in effect, returning a row of data prior to all remaining rows being merged into a single ordered string. Relational data service continues the process of fetch calls until all rows are returned to relational data service. It is transparent to relational data service whether the data is being returned under the fast direct output mode or not.

The system and method of this invention reduces the overhead associated with a sort, and returns sorted data to the caller as fast as possible. Two benefits of this are reduced load on the system, which leaves it available for other functions, and improved response time and throughput for the user of the sort function.

In the fast direct output method of this invention, sort does not write the final sorted data to a temporary file on disk as the prior art database systems have done. Instead, it returns the data directly to the caller. This technique does not wait until all data is in final sorted order before starting to return sorted data to the caller. With the fast direct output method of this invention, when sort recognizes that it is starting to get the data into final sorted order, it will pass each row directly to the caller as soon as the row is picked as the next in the sorted sequence.

Several gains are realized from this technique. Since the final sorted data is not written to a temporary file on disk, and then read back when requested by the user, total sort time is reduced. Also, elimination of that disk write and read reduces the load on a system leaving it available for other users. Another gain is in the response time for each sorted row. Since the rows are returned immediately as they are put in final sorted order, rather than sorting all rows before returning any of them to the caller, response time for each sorted row is improved. When the caller gets sorted data back, it may either display it immediately to the user, or use it in another step of an operation. In either case, any improvement in the individual response time is useful.

Although the foregoing invention has been particularly shown and described with reference to the preferred embodiments thereof, it will be understood by those skilled in the art that other changes in form may be made without departing from the scope of the claims.

We claim:

1. A method of processing a query statement in a relational database system, said method comprising the steps of:

reading said query statement into said relational database system;

generating a plan for said processing of said query statement with said relational database system;

analyzing, by said relational database system, said plan for processing the query statement;

selecting by said relational database system a mode for directiong output of a sort operation of said plan, said mode selection being responsive to said analyzing of said plan;

directly passing, in a first mode, said output of said sort operation to a user of said relational database system without writing to a disk if said plan has a sort input plan to a root plan of a table access plan, and passing, in a second mode, said output of said sort operation to a disk only if said plan has no sort input plan to a root plant of a table access plan.

2. A method of processing a query statement in a relational database system, said method comprising the steps of:

reading said query statement into said database system;

generating a plan for said processing of said query statement with said database system;

analyzing, by said relational database system, the query statement to determine if sorted output data of a sort operation of said query statement will be used a plurality of times;

writing the sorted output to disk if the sorted output data will be used a plurality of times; and passing the sorted output data directly to a user of said relational database system as the sorted output is ordered without writing to a disk if the sorted output data will be used only once.

3. A method of processing a query statement in a relational database system, said method comprising the steps of:

reading said query statement into said database system;

generating a plan for said processing of said query statement with said database system;

analyzing, by said relational database system, the query statement to determine if sorted output data of a sort operation of said query statement will be used a predetermined number of times;

writing the sorted output to disk only if the sorted output data will be used the predetermined number of times; and passing the sorted output data directly to a user of said relational database system as the sorted output data is ordered without writing to a disk if the sorted output data will be used less than the predetermined number of times.

4. A method of performing a sort operation in a relational database system, said method comprising the steps of:

reading said query statement into said database system;

generating a plan for said processing of said query statement with said database system;

determining, by a relational database manager, a first or second mode for directing a sort output of the sort operation;

ordering a plurality of rows in a relational database into a plurality of ordered sequence strings;

merging said ordered sequence strings into a plurality of merged sequence strings during at least one intermediate merge pass;

returning sequentially and directly, to a user of said relational database system, a plurality of final sorted rows resulting from a final merge pass of said merged sequence strings as each one of said final sorted rows are ordered without writing to a disk, in said first mode; and writing the final sorted rows to disk, only in said second mode.

5. A method of performing a sort operation in a relational database system, said method comprising the steps of:

reading said query statement into said database system;

generating a plan for said processing of said query statement with said database system;

determining, by a relational database manager, a first or second mode for directing a sort output of the sort operation;

ordering a plurality of rows in a relational database into a plurality of ordered sequence strings;

returning sequentially and directly, to a user of said relational database system, the plurality of ordered rows resulting from a merge pass of said ordered sequence strings as each one of said rows are ordered without writing to a disk, in said first mode; and writing to a disk the ordered rows resulting from the merge pass, only in said second mode.

6. A method of performing a sort operation in a relational database system, said method comprising the steps of:

reading said query statement into said database system;

generating a plan for said processing of said query statement with said database system;

determining, by a relational database manager, a first or second mode for directing a sort output of the sort operation;

ordering a plurality of rows in a memory of said relational database into an ordered string;

returning sequentially and directly, to a user of said relational database system, the plurality of rows from said ordered string in said first mode without writing to a disk; and writing the ordered string to disk as an ordered sequence string, only in said second mode.

7. A method of performing a sort operation in a relational database system, said method comprising the steps of:

determining, by a relational database manager, a first or second mode for directing a sort output of the sort operation;

ordering a plurality of rows in a relational database into a plurality of ordered sequence strings;

merging said ordered sequence strings into a plurality of merged sequence strings during at least one intermediate merge pass;

selecting sequentially one of said rows from a top entry from each of said merged sequence strings as a next entry in a final single ordered string during a final merge pass;

returning sequentially and directly without writing to a disk, to a user of said relational data processing system, said one of said rows as said row is being selected as the next entry in the final single ordered string, in said first mode, and writing said final single ordered string to disk only in said second mode.

8. A relational database system for processing a query statement, said system comprising:

means for reading a query statement into said relational database system;

means for generating a plan for said processing of said query statement with said relational database system;

an optimizer, in a relational database manager, for analyzing said plan for processing the query statement;

means for selecting a mode for directing output of a sort operation of said plan either directly to a user, or to a disk, said mode selection being responsive to said analyzing of said plan, and directly passing, in a first mode without writing to a disk, said output of said sort operation to a user of said relational database system if said plan has a sort input plan to a root plan of a table access plan;

passing, in a second mode, said output of said sort operation to a disk only if said plan has no sort input plan to a root plan of a table access plan.

9. A relational database system for processing a query statement, said system comprising:

means for reading said query statement into said relational database system;

means for generating a plan for said processing of said query statement with said database system to pass the output either directly to a user, or to a disk;

an optimizer interconnected to said means for reading, in a relational database manager, for analyzing said query statement;

means interconnected to said optimizer for selecting a mode of output for a sort operation of said query statement, said mode selection being responsive to said analyzing of said query statement to pass the output either directly to a user, or to a disk;

selecting a first mode for passing the output of a sort operation direclty to a user without writing to a disk if the query statement is an ORDER BY statement; and selecting a second mode for passing the output of a sort operation to a disk if the query statement is not an ORDER BY statement.

10. A relational database system for performing a sort operation, said system comprising:

means for determining, by a relational database manager, a first or second mode for directing a sort output of the sort operation;

means for ordering a plurality of rows in a relational database into a pluraltiy of ordered sequence strings;

means interconnected to said means for determining for returning sequentially and directly, to a user of said relational database system, the plurality of ordered rows resulting from a merge pass of said ordered sequence strings as each one of said rows are ordered without writing to a disk, in said first mode;

means interconnected to said means for returning for writing to disk the ordered rows resulting from said merge pass, only in said second mode, and wherein said ordered rows are final sorted rows; and said merge pass is a final merge pass.

11. A relational database system for performing a sort operation, said system comprising:

means for determining, by a relational database manager, a first or second mode for directing a sort output of the sort operation;

means for ordering a plurality of rows in a memory of said relational database into at least one ordered string;

means interconnected to said means for determining for returning sequentially and directly, to a user of said relational database system, the plurality of rows from said ordered string in said first mode without writing to a disk;

means interconnected to said means for returning for writing said ordered string to disk as an ordered sequence string, only in said second mode, said means for returning includes means for returning rows from a merge pass as each of said rows is ordered; and said means for writing to disk in said second mode includes means for writing to disk with ordered rows resulting from said merge pass.

12. A relational database system for performing a sort operation, said system comprising:

means for determining, by a relational database manager, a first or second mode for directing a final sort output of the sort operation;

means for ordering a plurality of rows in a relational database into a plurality of ordered sequence strings;

means for merging said ordered sequence strings into a plurality of merged sequence strings during at least one intermediate merge pass;

means for selecting sequentially one of said rows from a top entry from each of said merged sequence strings as a next entry in a final single ordered string during a final merge pass;

means interconnected to said means for determining for returning sequentially and directly, to a user of said relational database system without writing to a disk, said one of said rows as said row is being selected as the next entry in the final single ordered string, in said first mode; and means interconnected to said means for returning for writing said final single ordered string to disk only in said second mode.

13. A method of processing a query statement in a relational database system, said method comprising the steps of:

reading said query statement into said relational database system;

generating a plan for said processing of said query statement with said relational database system;

analyzing, by said relational database system, said plan for processing the query statement;

selecting by said relational database system a mode for directiong output of a sort operation either directly to a user, or to a disk, said mode selection being responsive to said analyzing of said plan;

directly passing, in a first mode, said output of said sort operation to a user of said relational database system without writing to a disk if said plan has a sort input plan to an outer plan of a join plan, and passing, in a second mode, said output of said sort operation to a disk only if said plan is performing an operation other than a sort input plan to an outer plan of a join plan.

14. The method of processing a query statement in a relational database system, said method comprising the steps of:

reading said query statement into said relational database system;

analyzing, by said relational database system, said query statement read into said relational database system;

selecting a mode of output for a sort operation of said query statement either directly to a user, or to a disk, said mode selection being based on said analyzed query statement;

selecting a first mode for passing the output of a sort operation direclty to a user without writing to a disk if said query statement is a GROUP BY statement; and selecting a second mode for passing the output of a sort operation to a disk only if said query statement is not a GROUP BY statement.

15. A method of processing a query statement in a relational database system, said method comprising the steps of:

reading said query statement into said relational database system;

analyzing, by said relational database system, said query statement read into said relational database system;

selecting a mode for passing the output of the sort operation either direclty to a user, or to a disk;

selecting a first mode for passing the output of a sort operation directly to a user without writing to a disk if the relational databse manager is performing an outer pass operation of a MERGE JOIN operation of the query statement, and a second mode is selected for passing the output of a sort operation to a disk only if the relational database manager is not performing an outer pass operation of a MERGE JOIN operation of the query statement.

16. A relational database system for processing a query statement, said system comprising:

means for reading said query statement into said relational database system;

means for generating a plan for said processing of said query statement with said relational database system;

an optimizer, in a relational database manager, for analyzing said plan for processing said query statement; and means for selecting a mode for directing output of a sort operation of said plan either direclty to a user, or to a disk, said mode selection being responsive to said analyzing of said plan;

said output of said sort operation being directly passable in a first mode to a user of said relational database system without writing to a disk if said plan has a sort input plan to an outer plan of a join plan, and said output of said sort operation being passabel in a second mode to a disk only if said plan has a sort input plan not to an outer plan of a join plan.

17. A relational database system for processing a query statement, said system comprising:

means for reading said query statement into said database system;

an optimizer, in a relational database manager, for analyzing said query statement; and means for selecting a mode for output of a sort operation of said query statement either directly to a user, or to a disk, said mode selection being responsive to said analyzing of said query statement;

said output of said sort operation being selected for passing in a first mode directly to a user of said relational database system without writing to a disk if said query statement is a GROUP BY statement, and said output of said sort operation being selected for passing in a second mode to a disk only if said query statement is not a GROUP BY statement.

18. A relational database system for processing a query statement, said system comprising:

means for reading said query statement into said database system;

an optimizer, in a relational database manager, for analyzing said query statement; and means for selecting a mode for output of a sort operation of said query statement either directly to a user, or to a disk, said mode selection being responsive to said analyzing of said query statement;

said output of said sort operation being selected for passing in a first mode directly to a user without writing to a disk if said relational database manager is performing an outer pass operation of a MERGE JOIN operation of said query statement, and said output of said sort operation being selected for passing in a second mode to a disk only if said relational database manager is performing an operation other than an outer pass operation of a MERGE JOIN operation of said query statement.

* * * * *

UNITED STATES PATENT AND TRADEMARK OFFICE
CERTIFICATE OF CORRECTION

PATENT NO. : 5,089,985

DATED : February 18, 1992

INVENTOR(S) : Philip Y. Chang, Daniel J. Coyle, Jr., Timothy R. Malkemus, Rebecca A. Rodriguez, and Philip J. Welti Page 1 of 2

It is certified that error appears in the above-identified patent and that said Letters Patent is hereby corrected as shown below:

Col. 10, line 66, please delete "directiong" and insert --directing--;

Col. 11, line 7, please delete "plant" and insert --plan--;
    line 19, after "disk", please insert --only--;
    line 33, please delete "said" and insert --a--, also delete "system" and insert --manager--.

Col. 12, line 33, after "database", please insert --system--;
    line 44, after "a", please insert --final--;

Col. 14, line 46, please delete "directiong" and insert --directing--;
    line 57, please delete "The" and insert --A--;
    line 62, please delete "said" first occurrence and insert --a--;

Col. 15, line 13, please delete "said" first occurrence and insert --a-- and please delete "system" and insert --manager--;
    line 20, please delete "databse" and insert --database--;
    line 39, please delete "direclty" and insert --directly--;

Col. 16, line 3, please delete "passabel" and insert --passable--; and

UNITED STATES PATENT AND TRADEMARK OFFICE
CERTIFICATE OF CORRECTION

PATENT NO. : 5,089,985
DATED : February 18, 1992
INVENTOR(S) : Philip Y. Chang, et al It is certified that error appears in the above-indentified patent and that said Letters Patent is hereby corrected as shown below:

Col. 16, line 26, please delete --relational-- after "said" second occurrence.

Signed and Sealed this

Twenty-ninth Day of June, 1993

Attest:

MICHAEL K. KIRK

Attesting Officer

Acting Commissioner of Patents and Trademarks